Patented Mar. 15, 1938

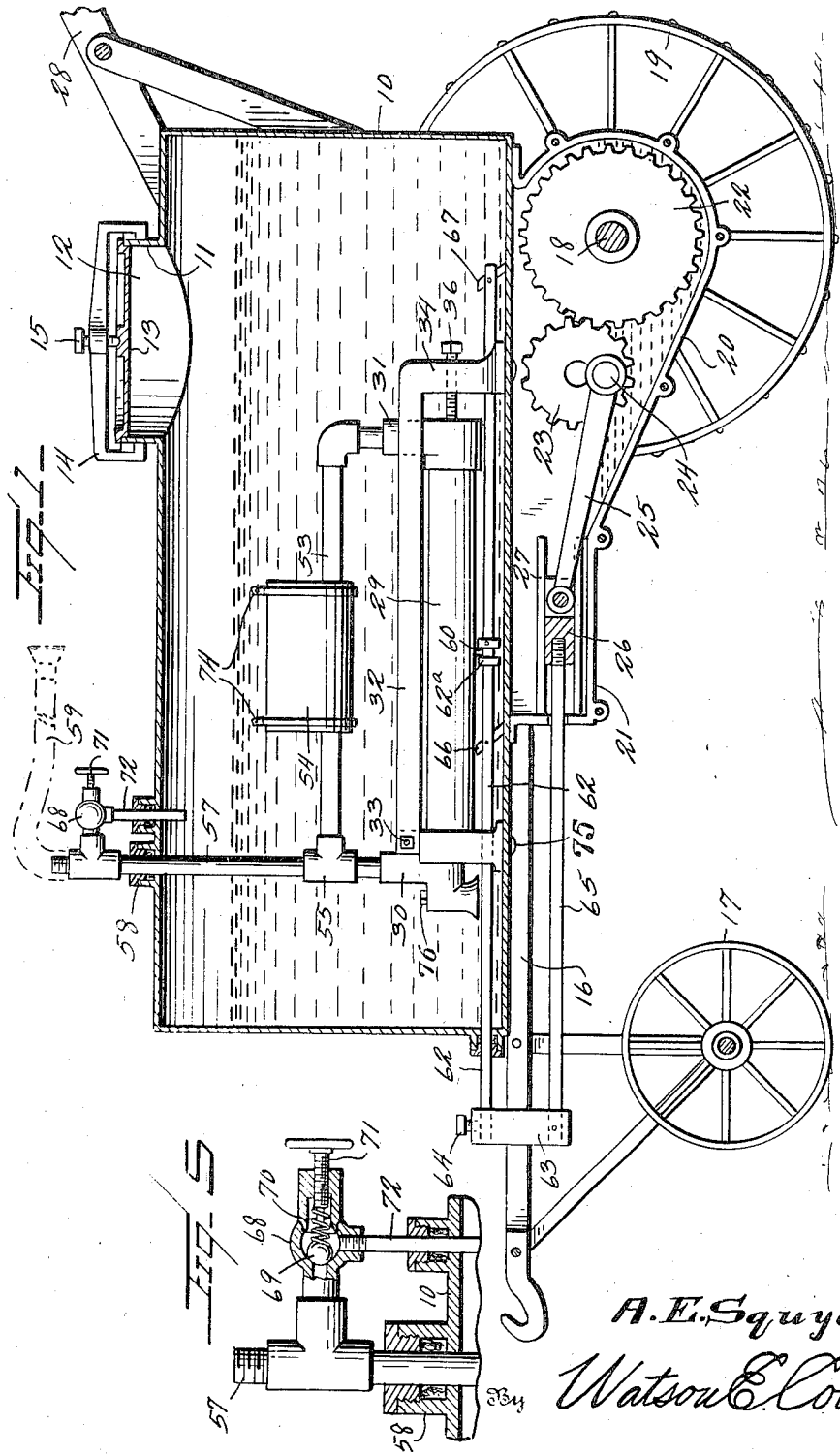

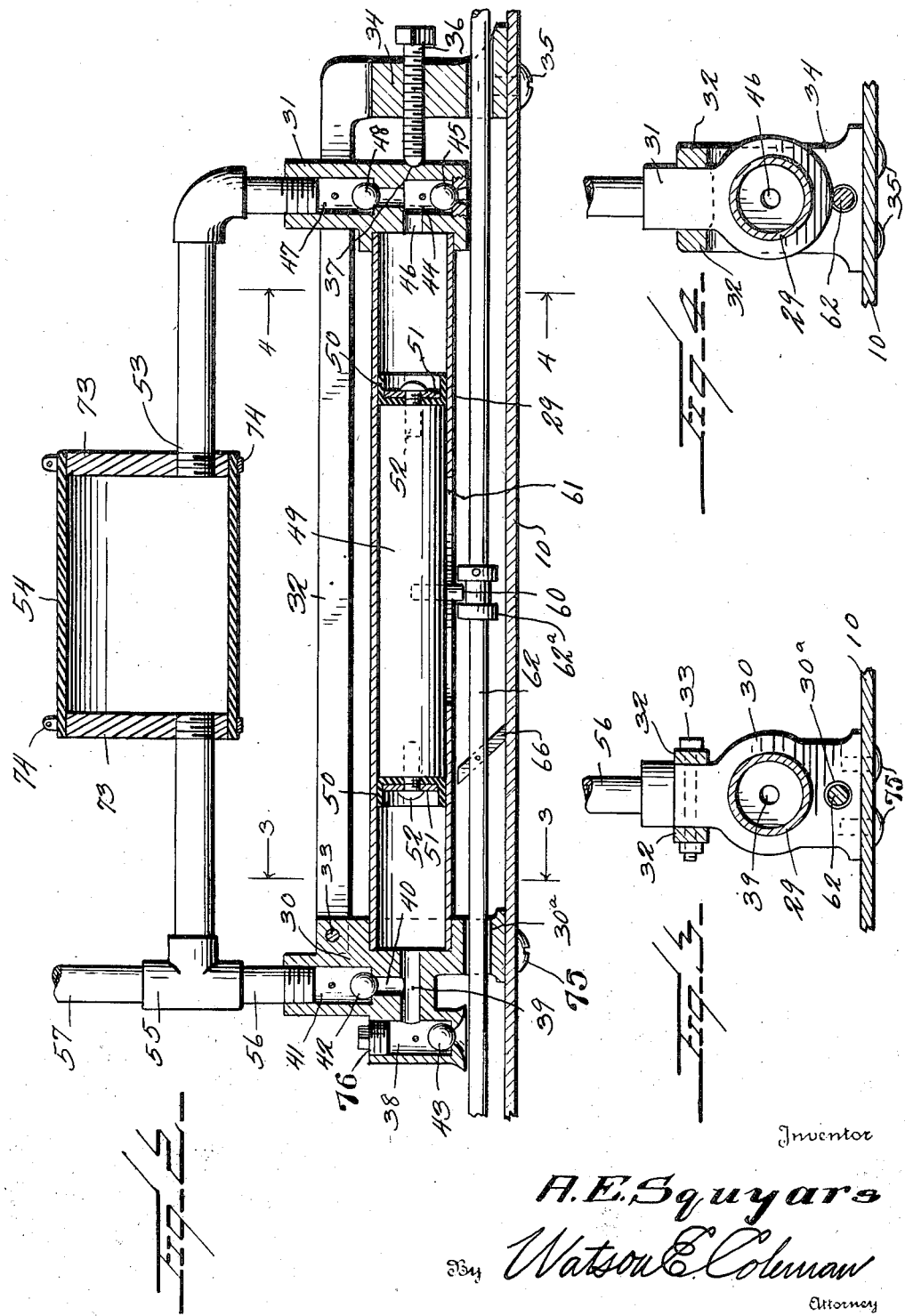

2,111,439

UNITED STATES PATENT OFFICE 2,111,439

SPRAYING MACHINE

Alexander E. Squyars, Nashville, Ga.

Application January 5, 1937, Serial No. 119,138

9 Claims. (Cl. 299—46)

This invention relates to devices for spraying trees, growing crops, tobacco and the like, and the general object is to provide a horse-drawn sprayer in which the spraying pump is entirely disposed within the spray containing tank, so as to prevent dirt or dust getting into the pump cylinder and the pump valves, and also to prevent any leakage of spraying liquid from the pump being wasted.

A further object of the invention is to provide a structure of this character which is very simple, cannot easily get out of order and in which the pump may be readily removed from its mounting within the sprayer tank to permit the replacement of the piston cups or the replacement or repair of the valves.

Other objects will appear in the course of the following description.

My invention is illustrated in the accompanying drawings wherein:

Figure 1 is a longitudinal sectional view of a sprayer constructed in accordance with my invention.

Figure 2 is an elevation partly in section of the pump itself.

Figure 3 is a section on the line 3—3 of Figure 2.

Figure 4 is a section on the line 4—4 of Figure 2.

Figure 5 is a longitudinal section through the pressure controlling valve and allied parts.

Referring to these drawings, 10 designates a tank which may be made of metal or any other suitable material and have any desired capacity. This tank has an opening 12 with an upstanding wall 11 whereby the tank may be filled, this opening being provided with a cover 13 held in place by the clamping yoke 14 and the set screw 15 extending through the yoke and bearing against the cover.

The tank is mounted upon a supporting frame 16 having means at its forward end whereby it may be connected to draft animals and having forward wheels 17. The axle 18 of the rear wheels 19 is mounted within a casing 20, which is attached to the frame 16 or to the bottom of the tank, this casing extending downward and then rearward, as at 21, and then extending downward, rearward and upward to enclose the axle 18.

Disposed within this casing 20 is a gear wheel 22 mounted upon the axle 18 and driven thereby, this gear wheel meshing with a gear wheel 23 having a crank pin 24 from which a connecting rod 25 extends to a cross head 26 sliding in guides 27 carried by the horizontal portion 21 of the casing 20. This casing is designed to be more or less filled with oil to thus lubricate the parts. Extending upward and rearward from the rear ends of the tank are bars 28 which may support a handle bar (not shown) whereby the machine may be guided.

Disposed within the tank 10 is a pump comprising a cylinder 29 closed at one end by a head 30 and at its rear end by a head 31. The cylinder and the two heads 30 and 31 are supported by longitudinally extending parallel bars 32, the forward ends of which engage at each side of the upper end of the head 30, as shown in Figure 3, and are bolted thereto by a bolt 33. The rear ends of these bars 32 are connected to an integral base 34 which extends down to the bottom of the tank, has a firm support thereon and is held thereto by means of the screw 35 or any other suitable means. Passing through the upright portion of this base is a screw 36 which bears against the rear face of the head 31 and enters a slight depression 37 therein. The heads 30 and 31 are recessed upon their confronting faces to receive the ends of the cylinder 29.

The head 30 is formed to provide an inlet chamber 38 and a duct 39 leading from this chamber into the forward end of the cylinder 29. Extending from the duct 39 is a duct 40 leading into an outlet chamber 41. Within the chamber 41 is disposed the check valve 42 while within the chamber 38 is disposed a check valve 43. The head 31 is formed to provide an inlet chamber 44 having therein the check valve 45 and connected to the rear end of the cylinder by means of the port 46. The outlet chamber of this head is designated 47 and passage into the outlet chamber is controlled by the check valve 48.

Disposed within the cylinder is the piston 49 shown as a cylindrical member loosely fitting the interior of the cylinder 20. This member 49 carries at its ends the piston cups 50 which may be made of leather, rubber or any other suitable material held in place against the ends of the piston by means of the washers 51 and the screws 52.

It will be seen that this structure is a double-acting pump and that upon a movement of the piston in one direction as, for instance, toward the right in Figure 2, liquid will be drawn in through the inlet chamber 38 and past the valve 43 into the interior of the cylinder while at the same time liquid is being ejected from the opposite end of the cylinder. On the other hand, upon a movement of the piston toward the left in Figure 2, liquid will be drawn in through the inlet 44 and into the cylinder while liquid at the opposite end of the cylinder will be ejected through the outlet chamber 41. The outlet chambers 47 and 41 are connected by nipples or other suitable means to an outlet pipe 53 shown as formed in two sections connected by a rubber sleeve 54. The pipe 53 is connected by a T 55 to the nipple 56 extending into the chamber 41 and also connected by this T to a discharge pipe 57. This pipe 57 extends through a stuffing box 58 formed on the top of the tank and the pipe 57 is connected by any suitable means to a flexible discharge pipe 59 shown in dotted lines in Figure 1, which in turn may be connected to a header from which a plurality of discharge pipes may lead. I have not illustrated the spray pipes or discharge pipes 59 in detail, as any suitable arrangement of the discharge pipes might be used.

It will be seen that the bars 32 embrace not only the head 30 but also embrace the head 31, as shown in Figure 4, so that both of these heads are held rigidly in place in proper alinement with each other while at the same time these heads may be readily released by taking out the bolt 33 and retracting the screw 36.

For the purpose of operating the pump piston, I provide a pin 60 which is attached to the piston 49 and extends through a slot 61 formed in the cylinder 29. This pin 60 engages with a circumferentially recessed block 62ª fast on the rod 62. This rod passes loosely through a guide opening 30ª formed in the head 30 and a guide opening 34ª formed in the support or base 34. The rod passes through a stuffing box 10ª formed in one end of the tank 10, as shown in Fig. 1. The rod 62 at its forward end, as also shown in Fig. 1, is detachably connected to one end of a vertically disposed coupling member 63, the rod 62 being held in engagement therewith by the set screw 64. The other end of this coupling member is connected to a connecting rod 65 which extends rearward on a level beneath the frame 16 and extends into the forward end of the casing 21 and is there connected to the cross-head 26, as shown in Fig. 1.

For the purpose of stirring up or agitating the liquid within the tank, which liquid commonly contains calcium arsenate, Paris green, etc., I attach to the rod 62 the agitator blades 66 and 67. These blades are in the form of thin bars or wings preferably of steel, and these agitators sweep the floor of the tank continuously as the rod is reciprocated. One of these agitators is disposed between the block 62 and the head 30, while the other agitator is disposed beyond the support 34 near the end of the pump rod. Thus the contents of the tank are kept continuously agitated and the solid material is kept from settling in the bottom of the tank.

Preferably I provide means whereby the pressure ejecting the spray liquid from the pipe 57 and through the spray nozzle or nozzles is adjustable. To this end, I have provided a relief valve casing 68 which is connected by a T to the pipe 57 and disposed within the casing is a valve 69 urged to its seat by a spring 70, the pressure on this spring being regulatable by means of the screw 71 which extends into the casing 68 and bears against the spring. Extending from the casing 68 is a relief pipe 72 which extends back into the tank. By relieving the pressure upon the spring 70, the valve 69 will open with less pressure than if the spring 70 be compressed and thus the pressure of the liquid as it is being ejected into the pipe 57 by the pump may be controlled. If the liquid is being ejected with too much pressure, the pressure of the spring 70 is lessened and if, on the other hand, a greater pressure is desired, the valve 69 is held to its seat more firmly by increasing the tension on the spring 70.

In order to provide an air pressure chamber which will hold pressure of air on the liquid at all times so that there will be no interruption to the steady flow of the liquid from pipe 57 and also to secure a flexible connection between the two sections of the pipe 53, I connect these pipe sections 53 by a relatively large pipe section or sleeve 54 of rubber, as previously stated, such as rubber hose. For instance, if the pipe sections 53 are ⅜" in diameter, then the rubber hose will be approximately 2" in diameter or more as desired. This rubber hose is stopped at its ends by heads 73 held in place by clamps 74. The pipe sections 53 enter these heads at points adjacent the lowermost portion of the sleeve 54. Thus an air chamber is formed in the upper portion of the rubber hose, which will hold pressure of air on the liquid and thus create a continuous pressure on the liquid. Furthermore, this elastic sleeve 54 permits the pipe line formed by the sections 53 to be bent or flexed at this rubber section 54, thus permitting the pump barrel to be released without removing pin 33 and then the pump barrel may be withdrawn through the man-hole opening.

It will be seen that as the vehicle is drawn along, the rotation of the axle 18 will cause the rotation of the pinion 23 and the reciprocation of the cross head 26 and the reciprocation of the pump piston. Inasmuch as this is a double-acting pump, it follows that upon each reciprocation of the piston 49, the liquid will be drawn in from the tank at one end of the pump and discharged at the opposite end. It will likewise be seen that the manhole 12 permits the pump to be readily disassembled and removed from within the tank.

The cylinder of the pump may be readily removed by withdrawing the screw 36 whereupon the pipe section 53 with its connected head 31 may be lifted up, thus detaching it from the cylinder and permitting the ready detachment of the cylinder in turn from the socket in the head 30. The cylinder may then be withdrawn through the manhole. The head 31 may also be removed from the tank by disconnecting pipe 53 from the sleeve 54, if desired.

It is also obvious that by removing the screws 75, which as shown in Figure 2, hold the head 30 to the bottom of the tank, the head 30 may be withdrawn and then by detaching the plug 76, closing the upper end of the chamber 38, the ball 43 may be replaced or renewed and by detaching the nipple 56, the ball 42 may be removed.

It is to be particularly understood that the drawings and particularly Fig. 2, do not show the parts in their proper relative scale, the pipe sections 53 being, of course, smaller in diameter relative to the pump cylinder than illustrated. As a matter of actual practice, the pipe sections 53 will be approximately ⅜" in diameter while the rubber hose sleeve 54 connecting the pipe sections will have a diameter of approximately 2" or more and may have any desired length.

Inasmuch as the pumping mechanism is entirely contained in the tank, it is obvious, in the first place, that no dirt, dust or other foreign matter can get in to clog the pump or score the interior of the cylinder or the piston cups or prevent the proper operation of the valves, and that further, if there is any leakage from the pump, it is backed into the tank so that none of the relatively costly spraying liquid is lost.

It is also to be understood that any number of pumps may be placed in the same tank if desired or operated by the traction wheels of the vehicle.

While I have illustrated my invention as applied to a hand-guided horse-drawn machine, it is obvious that the principle of the invention might be applied to a machine which would be driven by a driver instead of being guided by hand or to a machine driven by a motor.

While I have illustrated certain details of construction and arrangement of parts, it is obvious that many changes might be made in the details of arrangement without departing from the spirit of the invention as defined in the appended claims.

What is claimed is:—

1. A sprayer machine of the character described, including a tank, a wheeled frame supporting the tank, a pump disposed within the tank and including a cylinder and forward and rear heads, each head having a valve controlled inlet port connected to the interior of the cylinder and a valve controlled outlet port, a discharge pipe leading through the tank, pipes connecting the discharge pipe with the outlet ports of the heads, a double-acting piston disposed within the cylinder, the cylinder being longitudinally slotted, a piston rod operatively connected to said piston through the slot in the cylinder and extending forward through the tank, a connecting rod extending parallel to and beneath the tank, a member operatively connecting the connecting rod with the piston rod, and means for reciprocating the connecting rod to thus reciprocate the piston.

2. In a sprayer of the character described, a wheel-supported tank, a pump therein including a cylinder, heads having recesses into which the ends of the cylinder are inserted, each of said heads having a valve controlled inlet and a valve controlled outlet, a double-acting piston disposed within the cylinder, the cylinder being slotted, a member extending through said slot, a connecting rod connected to said member and extending through the wall of the tank, means mounted upon the sprayer for reciprocating said connecting rod, and means for supporting the pump structure within the tank including parallel bars embracing both of said heads and detachably connected at one end to one of said heads, the opposite ends of the bars being connected to each other by an integral portion extending to the bottom of the tank and attached thereto and a set screw passing through said portion and bearing against the adjacent head.

3. A spraying machine of the character described, including a supporting frame having forward and rear traction wheels, the rear wheels having an axle, a tank supported upon said frame and having a manhole opening, a pump disposed within the tank and including a longitudinally extending cylinder and forward and rear detachable heads, each of said heads being recessed for the reception of the end of the cylinder, each of said heads having an inlet valve controlled opening and a valve controlled outlet, a discharge pipe operatively connected to the outlet openings of both heads, the cylinder being longitudinally slotted at its bottom, a double-acting piston disposed within the cylinder, a member connected to the piston and passing out through said slot, a forwardly extending piston rod connected to said member and extending out through the forward end of the tank, a vertically disposed coupling detachably connected to the forward end of the piston rod, a longitudinally extending connecting rod extending rearward from the coupling member, a housing attached to the bottom of the tank and enclosing said gear wheel on the rear axle and at its forward end formed to provide cross head guides, a cross head on said guides connected to the rear end of the connecting rod, a pinion engaged by said gear wheel and carrying the wrist pin operatively connected to the cross head, means for supporting the pump within the tank including a pair of longitudinally extending bars embracing the forward head and detachably connected thereto and embracing the rear head, said bars being then connected by a vertical portion extending to the bottom of the tank and detachably connected thereto, and a set screw extending through said vertical portion and bearing against the rear head whereby to detachably hold the heads in operative engagement with the ends of the cylinder.

4. A spraying machine of the character described, including a tank, a pump mounted within and upon the bottom of the tank and including a cylinder and opposed heads, inlet and outlet valves mounted within the heads, a discharge pipe extending out of the tank, operative connections between each head and the discharge pipe, a piston disposed within the cylinder, a reciprocable rod extending parallel to and beneath the cylinder, operative connections between the rod and the piston, and agitators mounted upon the rod, one of said agitators being disposed beneath the cylinder and the other of the agitators being disposed exteriorly of one end of the cylinder.

5. A spraying machine of the character described, including a tank, a pump disposed within the tank and including a cylinder and forward and rear heads engaging the bottom of the tank, each head having a valve controlled inlet port connected to the interior of the cylinder and a valve controlled outlet port, a discharge pipe leading through the tank, pipes connecting the discharge pipe with the outlet ports of the heads, a double acting piston disposed within the cylinder, the cylinder being longitudinally slotted, a piston rod operatively connected to said piston through the slot in the cylinder and extending parallel to the cylinder and through the lower portions of said heads, means for reciprocating said rod, and agitators mounted upon the rod beneath the cylinder and exteriorly of at least one of said heads.

6. A spraying machine, including a liquid containing tank having a manhole in its top, detachable means for normally closing said manhole, a double acting pump disposed within the tank and comprising a cylinder and heads having recesses within which the ends of the cylinder are detachably disposed, a frame resting upon the bottom of the tank and supported by the forward head, a screw passing through said frame and engaging the rear head and holding the rear head in engagement with the cylinder, a discharge pipe leading from the forward head, a sectional pipe leading from the rear head into the discharge pipe, the sectional pipe being formed in two sections, and a flexible tubular connection between the two sections whereby to permit the sectional pipe to be flexed and thus permit the ready detachment of the rear head from the cylinder and the removal of the cylinder through the manhole.

7. A spraying machine including a liquid containing tank having a man-hole in its top, a double acting pump disposed within the tank and comprising a cylinder and heads having recesses within which the ends of the cylinder are detachably disposed, a frame resting upon the bottom of the tank and supported by the forward head, a screw passing through one end of said frame and engaging the rear head and holding the rear head in engagement with the cylinder, a discharge pipe leading from the forward head, and a flexible tubular connection between the discharge pipe and the rear head whereby to permit the tubular connection to be flexed and thus permit the ready detachment of the rear head from the cylinder and removal of the cylinder through the man-hole.

8. A spraying machine including a liquid containing tank, a frame supporting the tank and having traction wheels, a horizontally disposed pump cylinder extending parallel to but slightly spaced from the bottom of the tank and having a longitudinally extending slot in its lower face, a double-ended piston operating in the cylinder, heads at opposite ends of the cylinder, each head having an inlet and on outlet valve and means detachably supporting the cylinder at its ends upon but in spaced relation to the bottom of the tank, a reciprocatable rod disposed below the cylinder, means extending through the slot and connecting the rod with the piston, guides for the rod, and means operated by the traction wheels of the machine constructed and arranged to reciprocate said rod.

9. In a structure of the character described, a tank, a pump cylinder therein extending parallel to the bottom of the tank, opposed heads each having a socket into which the adjacent end of the cylinder seats, each head having an inlet port and valve and an outlet port and valve, one of said heads resting on and being secured to the bottom of the tank, a supporting frame engaged at one end with the last named head and at the other end resting on and secured to the bottom of the tank, a screw passing through the last named end of the frame and extending axially of the cylinder and engaging against the adjacent head whereby to support this end of the cylinder and valve head and detachably hold the cylinder within the sockets of the heads, a double-acting piston within the cylinder, and means for reciprocating the piston.

ALEXANDER E. SQUYARS.